Sept. 29, 1964  F. J. F. VAN DER PLAS  3,151,139
COUNTERCURRENT EXTRACTION AND PURIFICATION OF SECONDARY AND
TERTIARY SATURATED UNSUBSTITUTED C$_9$-C$_{19}$ MONOCARBOXYLIC ACIDS
Filed July 14, 1961
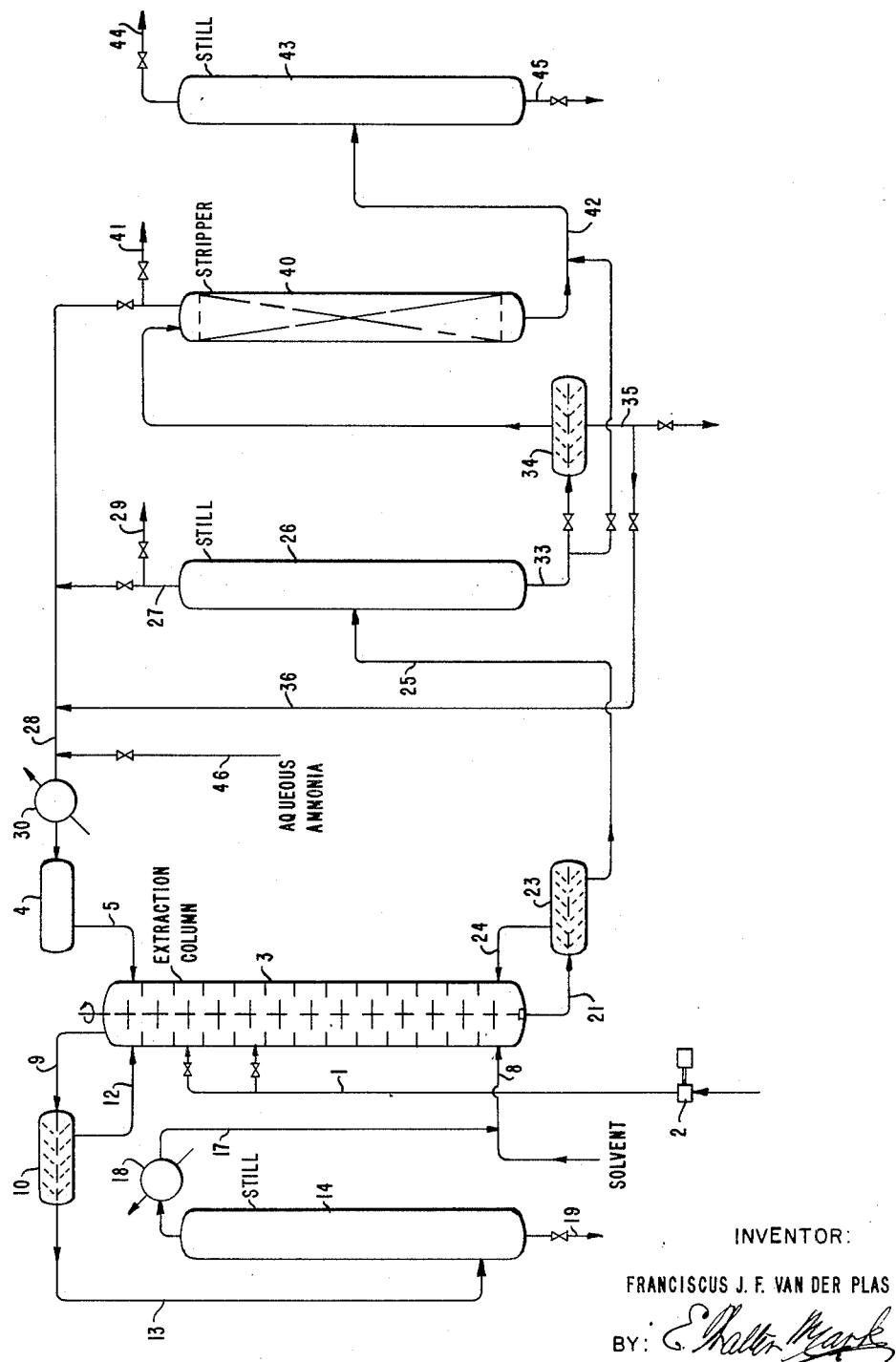
INVENTOR:
FRANCISCUS J. F. VAN DER PLAS
BY:
HIS AGENT

United States Patent Office 3,151,139
Patented Sept. 29, 1964

3,151,139
COUNTERCURRENT EXTRACTION AND PURIFICATION OF SECONDARY AND TERTIARY SATURATED UNSUBSTITUTED $C_9$–$C_{19}$ MONOCARBOXYLIC ACIDS
Franciscus J. F. van der Plas, Amsterdam, Netherlands, assignor to Shell Oil Company, New York, N.Y., a corporation of Delaware
Filed July 14, 1961, Ser. No. 124,111
Claims priority, application Netherlands, Sept. 29, 1960, 256,373
3 Claims. (Cl. 260—419)

This invention relates to the recovery and purification of monocarboxylic acids of secondary and tertiary character obtained by the reaction of carbon monoxide and water with olefins, or by reaction of carbon monoxide and water with paraffin waxes together with hydrogen acceptors.

The invention is applied broadly to recovery and purification of secondary and tertiary aliphatic monocarboxylic acids contained in crude mixtures comprising these acids in admixture with hydrocarbons and polymeric materials not readily separable by ordinary distillation means. Crude mixtures comprising these acids are obtained in known processes wherein olefins are reacted with carbon monoxide and water, or paraffins are reacted with carbon monoxide and water in the presence of hydrogen acceptors, with the aid of catalysts consisting essentially of liquid concentrated inorganic acids.

The invention is applied with advantage to the recovery and purification of secondary and tertiary monocarboxylic acids contained in crude reaction products obtained by the reaction of olefins with carbon monoxide and water in the presence of a catalyst comprising phosphoric acid, boron trifluoride and water, or an admixture of boron trifluoride and water. This method of producing the crude, acid-containing mixtures is carried out in liquid phase, at a temperature in the range of from about −25 to about 100° C. and at relatively low pressures, for example, in the range of from about 20 to about 150 atmospheres. Suitable methods for preparing the crude secondary and tertiary monocarboxylic acid-containing mixtures are disclosed in U.S. Patent 2,876,241 and in copending applications Serial Nos. 858,609; 858,796; and 858,797, filed December 10, 1959, now U.S. Patents 3,059,005, and 3,059,006, respectively. Under the conditions of these low temperature, liquid phase carboxylic acid-producing processes, the olefinic charge is converted to reaction products comprising secondary or tertiary carboxylic acids.

Suitable olefinic charge materials thus reacted with carbon monoxide and water to produce the alpha-branched secondary and tertiary monocarboxylic acids comprise commercially available unsaturated hydrocarbons predominating in monoolefins such as, for example, branched or unbranched pentenes, hexenes, heptenes, octenes, nonenes, decenes and higher alkenes; polymers and copolymers of such alkenes, such as diisobutylene, propylene-dimer, -trimer, and -tetramer; cyclic alkenes, such as cyclopentene and cyclohexene. Commercially available mixtures comprising these alkenes are also used, for example, olefin-containing hydrocarbon fractions such as obtained by thermal vapor phase cracking of paraffin wax in the presence of steam. Olefin-rich products obtained in the Fischer-Tropsch synthesis carried out under moderate pressure also constitute examples of a suitable source of the alpha-branched monocarboxylic acids. Monoolefins generally employed in the production of the carboxylic acids comprise those having up to twenty carbon atoms to the molecule.

The alpha-branched monocarboxylic acids recovered and purified in accordance with the invention consist essentially of saturated secondary and tertiary monocarboxylic acids which may be represented by the general formula

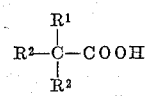

wherein $R^2$ represents an alkyl group and $R^1$ represents hydrogen or an alkyl group. They may further be characterized as dialkyl- and trialkyl-acetic acids. The acids generally comprise the tertiary acids in predominant amounts.

Characteristics inherent in, and to some extent peculiar to, these acids recovered and purified in accordance with the present invention, are believed attributable at least in part to the method of their production. These branched acids, particularly those having from six to twenty-one carbon atoms to the molecule find application in the production of many valuable derivatives therefrom. They are starting materials in the production of epoxy derivatives. As disclosed in British Patent 825,805, their salts with drier metals, such as Co, Ni, etc., produce driers possessing valuable characteristics. They are, furthermore, used in the production of alkyd resins, plasticizers and lubricating oils.

Suitability of these acids for use in many fields of application is, however, dependent upon a relatively high degree of purity.

The crude alpha-branched secondary and tertiary monocarboxylic acids, as obtained in the processes above referred to, generally consist of relatively complex mixtures containing the desired secondary and tertiary monocarboxylic acids in admixture with organic impurities including hydrocarbons and by-products of polymeric character. Separation of the desired acids in a relatively high state of purity from such mixtures cannot be attained by such means as distillation under ordinary or reduced pressure, and the like, in practical scale equipment. Often such expedients result in substantial loss of product due to decomposition of the acids with regeneration of olefins. A further drawback heretofore often encountered when resorting to such methods was substantial discoloration of the organic acid product. It is also possible to neutralize the acids by adding aqueous caustic alkali solution, followed by separation of the hydrocarbons, if necessary by extraction, and then to recover the carboxylic acids by adding mineral acid; however, this method is cumbersome and entails a considerable consumption of chemicals.

It has now been found that these secondary and tertiary monocarboxylic acids are recovered in a high state of purity from these crude mixtures by a simple but highly efficient continuous selective liquid extraction procedure wherein solvents and adjuvants are continuously recovered within the system.

In accordance with the invention the crude mixtures, containing the aliphatic alpha-branched secondary and tertiary monocarboxylic acids in admixture with organic impurities comprising hydrocarbons and reaction products of polymeric character, are subjected to liquid phase extraction with aqueous ammonium hydroxide flowing countercurrent to a water-immiscible organic solvent, thereby separating an aqueous phase comprising ammonium salts of said monocarboxylic acids from an organic phase comprising said solvent and said organic impurities, and said aqueous phase is subjected to an elevated temperature, thereby decomposing said ammonium salts with the liberation of said monocarboxylic acids.

The strength of the aqueous ammonium hydroxide solution employed, and the relative amount thereof, will vary within the scope of the invention depending to some extent upon the specific composition of the material being extracted and the organic solvent used. The ammonium hydroxide solution is, however, always used in concentrations and amount providing a stoichiometrical excess of ammonia over that required to react with the monocarboxylic acid content of the crude organic acid charge to the system. In general, it is preferred to employ the aqueous ammonium hydroxide in an amount assuring the presence of ammonia in an excess of at least 20% over the stoichiometrical amount needed to react with the monocarboxylic acid content of the crude organic acid charge. In general availability of ammonia during the extraction in an amount providing an excess of from about 50 to about 90% over the stoichiometrical amount is satisfactory. When the monocarboxylic acids being extracted contain more than twelve carbon atoms, for example, from about 14 to about 21 carbon atoms to the molecule, it is preferred to have the ammonia present in an amount equal to at least twice that needed to react with the total monocarboxylic acid content of the charge.

The introduction of a hydrocarbon alcohol, for example, an alkanol having from about one to about ten carbon atoms to the molecule, such as, methanol, ethanol, isopropanol, the pentanols, octanols, and the like, or mixtures thereof, into the extraction zone is comprised within the scope of the invention. The specific alcohol preferably employed will depend to some extent upon the specific composition of the crude organic acid charge. The introduction of an alcohol into the extraction zone is generally preferred when the carboxylic acids being extracted have fourteen or more carbon atoms to the molecule. Alcohol may be added to the aqueous ammonia, to the crude organic acid charge, to the organic solvent, and/or to more than one thereof. The use of an alkanol having from one to three carbon atoms is preferred. These are preferably added to the aqueous ammonium hydroxide charge.

The water-immiscible solvent employed in the process may comprise a substantially aromatic-free saturated hydrocarbon solvent. Suitable solvents comprise the normally liquid paraffinic and naphthenic hydrocarbons or mixtures thereof as, for example, the butanes, pentanes, hexanes, heptanes, octanes, decanes, etc. Aromatic-deficient, or aromatic-free gasoline fractions are very suitable as water-immiscible solvent. Preferably a gasoline fraction is used having a boiling range enabling its separation from the organic impurities in the crude acids by simple distillation.

By effecting the extraction as described herein, the formation of emulsion is generally avoided so that both phases separate rapidly and completely. It is generally desirable for the organic phase to be continuous and the aqueous phase dispersed. However, when extracting acids with less than 12 carbon atoms per molecule it is quite possible for the aqueous phase to be continuous and for the organic phase to be dispersed without emulsions being formed.

The extraction is carried out at substantially normal conditions of temperatures and pressures. The use of temperatures and pressures somewhat above or below atmospheric may, however, be employed within the scope of the invention.

Extraction may be effected in conventional equipment for continuous countercurrent extraction. Use may be made of columns with Raschig rings or other fillers, baffle plates, perforated plates, wire gauze or the like. The extraction agent may be finely divided in the liquid to be extracted by supplying this agent under pressure through spray nozzles. Particularly suitable for the above process are extraction columns provided with a rotatable shaft with rotor discs, and with stator rings attached to the inner wall of the column, as described in Netherlands Patent 67,932 and in "Chemical Engineering Progress," volume 51 (1955), pages 141–146. If desired, the extraction may be effected in a number of columns in series. Per column a stirring rate may be maintained which is most favorable for the corresponding extraction phase.

Under the above-defined conditions there will be formed within the extraction zone an aqueous phase comprising the ammonium salt of the monocarboxylic acids contained in the crude organic acid charged, and an organic phase containing the organic impurities such as hydrocarbons and polymeric products.

The organic phase and the aqueous phase formed in the extraction zones are removed therefrom. The aqueous phase is subjected to a temperature sufficiently high to effect the decomposition of the ammonium salts contained therein with the liberation of the desired secondary and tertiary monocarboxylic acids and ammonia. Any suitable heating zone may be employed within the scope of the invention. In a preferred embodiment of the invention the heating zone comprises a distillation zone wherein ammonia is taken off as overhead and the desired monocarboxylic acids are comprised in the distillation bottoms. The bottoms will often readily stratify with the formation of a supernatant monocarboxylic acid layer and a lower aqueous ammoniacal layer. The aqueous may then be recycled directly to the extraction zone and the carboxylic acid layer subjected to treatment effecting the removal of residual water and ammonia therefrom.

Comprised within the scope of the invention is the subjection of the aqueous phase, emanating from the extraction, to conditions sufficiently severe in a single heating, for example, distillation step, to effect the removal of substantially all volatiles comprising water and ammonia therefrom, thereby obtaining the monocarboxylic acids directly in a relatively high state of purity without further processing. This method of operation is at times preferred, particularly when the monocarboxylic acids contain more than about twelve carbon atoms to the molecule, and emulsions may tend to form during the process of their liberation from their salts.

The organic phase, consisting essentially of organic solvent and organic impurities, separated in the extraction zone is subjected to suitable treatment such as, for example, distillation, to remove at least a substantial part of the organic impurities therefrom. The organic solvent, now free of any substantial amount of organic impurities, is recycled to the extraction as the organic solvent used therein.

In the attached drawing, forming a part of the present specification, there is shown in the single figure, a more or less diagrammatic elevational view of one form of apparatus suitable for executing the invention.

Referring to the drawing: crude alpha-branched aliphatic secondary and tertiary monocarboxylic acids, in admixture with organic impurities comprising paraffinic and aromatic hydrocarbons and organic impurities of polymeric character, emanating from an outside source, are forced through line 1, by means of pump 2 into extraction column 3. Aqueous ammonium hydroxide is passed from storage vessel 4, through line 5, into the top of extraction column 3. A solvent, consisting essentially of a non-aromatic gasoline, is passed through line 8 into the lower part of extraction column 3. Within the extraction column 3 there is formed (a) an aqueous phase consisting essentially of water, ammonium hydroxide, and the ammonium salts of the monocarboxylic acids introduced into the column 3, and (b) an organic phase consisting essentially of the gasoline solvent and the organic impurities comprising hydrocarbons and polymeric impurities introduced into the column 3. The organic phase is passed from column 3, through line 9, into accumulator 10. Within accumulator 10 entrained aqueous phase is separated by stratification as a lower layer and passed therefrom through line 12 back into column 3. The organic phase is taken from accumulator 10 and passed through line 13 into a still 14. In still 14 gasoline solvent is distilled overhead and passed through line 17, provided with cooler 18, into line 8, leading into column 3. Still bottoms, comprising organic impurities including hydrocarbons and material of polymeric character, are removed from column 14, by means of valved line 19, and eliminated from the system.

The aqueous phase comprising water, ammonium hydroxide, and ammonium salts of the secondary and tertiary monocarboxylic acids, is passed from extraction column 3 through line 21 into vessel 23. In vessel 23 any entrained organic phase comprising solvent is separated by stratification as an upper layer and returned to column 3 by means of line 24. The aqueous phase is taken from vessel 23, through line 25, into a distillation zone comprising a still 26. Within still 26 the aqueous phase is subjected to distillation conditions, resulting in the decomposition of the ammonium salts of the carboxylic acids with the formation of a vapor phase comprising ammonia and a liquid phase comprising water and the desired secondary and tertiary monocarboxylic acids. The vapor phase is taken overhead from still 26 and passed through line 27 into line 28 provided with cooler 30 leading into vessel 4. A valved line 29 is provided for bleeding at least a part of the flow from line 29. A valved line 46 is provided for introducing make-up aqueous ammonium hydroxide into the system. In general a kettle temperature of from about 65 to about 125°, and usually in the range of from about 90 to about 110° C., is satisfactory. The specific temperature prevailing therein will, of course, vary in accordance with the specific composition of the charge to still 26.

Liquid phase is taken from still 26 and passed through line 33 into an accumulator 34. Within accumulator 34 an upper layer, consisting essentially of secondary and tertiary monocarboxylic acids, is separated from a lower aqueous layer comprising ammoniacal water. The lower layer is passed from accumulator 34, through valved lines 35 and 36, into line 28 leading to vessel 4.

The upper layer is passed from accumulator 34 into a suitable stripping zone, for example, still 40. Within stripping column 40 residual water and ammonia is stripped from the monocarboxylic acids. The temperature within stripping column 40 is generally higher than that maintained in still 26. The stripper 40 is preferably packed with a suitable packing material such as Raschig rings or the like. The temperature in stripper 40 will vary in accordance with the specific charge employed and the degree of residual water removal desired. In general, a temperature in the range of from about 125 to about 200° C., and usually from about 155 to about 185, are found satisfactory. Overhead from stripper 40, consisting essentially of ammonia and water is passed therefrom through line 28 into accumulator 4. A take-off line 41 is provided for the bleeding of overhead from stripper 40 from the system as required. Stripper bottoms, consisting essentially of secondary and tertiary monocarboxylic acids substantially free of water and ammonia, are passed from stripper 40, through line 42 into a still 43, wherein the mixed acids are distilled to separate them into fractions of varying boiling temperatures. Lower boiling alpha-branched aliphatic secondary and tertiary monocarboxylic acids are taken overhead through line 44, and higher boiling members thereof are removed as side streams, and/or as bottoms through valved line 45 as final products.

If desired bottoms from still 26 may be passed directly through lines 33, 35 and 42 into finishing still 43. This method of operation is employed when substantially all of the water and ammonia is taken overhead in the still 26.

The process of the invention therefore provides for the efficient recovery and purification of crude alpha-branched aliphatic secondary and tertiary monocarboxylic acids with a minimum of operative steps in an extractive system wherein all solvents and reactants are readily recovered and recycled.

*Example I*

Crude monocarboxylic acids were prepared as follows:
A fraction of the products obtained by thermal cracking of paraffins in the vapor phase in the presence of steam, which fraction consisted of alkenes having 8 to 10 carbon atoms was selectively hydrogenated to convert any dienes present into alkenes. After this hydrogenation the alkenes constituted 76% by weight of the mixture, viz. 39% by weight of linear, 20% by weight of branched and 17% by weight of cyclic alkenes. The remainder of the mixture consisted of saturated hydrocarbons (17% by weight) and aromatics (7% by weight).

The olefinic fraction was converted to monocarboxylic acids by reaction with carbon monoxide and water at 60° C. in the presence of a catalyst consisting of $H_3PO_4$, $BF_3$ and $H_2O$. The reaction mixture was kept at constant volume and maintained at substantially constant composition by recycling and control of rate of feed and product removal. A monocarboxylic acid phase was separated from reactor effluence by stratification, washed at 40° C. with water and then at 20° C. with aqueous sodium bicarbonate. The resulting crude acid mixture consisted essentially of (alpha branched) secondary and tertiary aliphatic monocarboxylic acids having 9 to 11 carbon atoms to the molecule in admixture with organic impurities which consisted essentially of hydrocarbons including unconverted charge, polymers and a lesser amount of other reaction products the complexity of which does not permit of ready determination.

The crude carboxylic acid mixture so obtained was subjected to contact with aqueous ammonium hydroxide in an extraction column of the rotary contractor type in the presence of gasoline as secondary solvent. The column was 2 m. long, had a capacity of 2 liters and was will of gasoline at the start up. The gasoline used had a boiling range of 95–115° C. and was introduced into the lower part of the column at the rate of 0.5 lit./hr. The aqueous ammonium hydroxide, containing 6% by weight of ammonia, was introduced into the top of the column at the rate of 0.7 lit./hr. The crude monocarboxylic acid was charged at 0.3 lit./hr. A gasoline phase was taken continuously from the top of the column and distilled. The distillation residue consisted essentially of the organic impurities in the crude mono-carboxylic acid charge and contained only 0.2 to 0.3% of the desired monocarboxylic acids.

A liquid phase, consisting essentially of aqueous solution of the ammonium salts of the monocarboxylic acids charged and ammonium hydroxide, was taken continuously from the lower part of the column and stratified. The aqueous phase comprising the ammonium salts of the monocarboxylic acids was subjected to continuous distillation at 100° C. and atmospheric pressure, thereby driving off ammonia. Distillation bottoms consisting essentially of free monocarboxylic acids were passed downwardly through a packed column maintained at 170° C. to drive off residual ammonia and water.

The yield of essentially pure alpha-branched monocarboxylic acids so obtained was 99.5% (nitrogen content 0.2 to 0.3% by weight). The monocarboxylic acids were fractionated under reduced pressure and an overhead fraction consisting of secondary and tertiary monocarboxylic acids having 9 to 11 carbon atoms to the molecule, and constituting 93% of the total acid charge to the fractional distillation, was taken overhead. This overhead fraction had an acid number of 326, a nitrogen content of 100 and a Hazen color of less than 50. Bottoms from the fractionation were found to consist predominantly of alpha-branched monocarboxylic acids having 18–20 carbon atoms to the molecule.

*Example II*

The operation of foregoing Example I was repeated under substantially identical conditions but with the exception that the crude monocarboxylic acid, gasoline and aqueous ammonium hydroxide were each charged to the rotary extraction column at the rate of 0.5 lit./hr., and that the aqueous ammonium hydroxide used contained 12% by weight of ammonia. Results obtained were substantially identical to those obtained in the foregoing Example I.

*Example III*

A crude monocarboxylic acid charge consisting essentially of 60% by weight of secondary and tertiary monocarboxylic acids having 15 to 19 carbon atoms to the molecule and 40% by weight of paraffins and aromatics, was produced from vapor phase cracked wax $C_{14}$–$C_{18}$ olefins, carbon monoxide and water as described in Example I. The crude monocarboxylic acid charge was extracted in a rotary disc type extraction column as in foregoing Example I, but using as the aqueous ammonium hydroxide extractant a mixture consisting of 80% by weight methanol, 16% w. water and 14% w. ammonia. The ammonia extractant was charged at the rate of 0.7 lit./hr., the gasoline solvent at the rate of 0.5 lit./hr. and the crude monocarboxylic acid at the rate of 0.3 lit./hr.

The aqueous ammonium salt-containing phase taken from the extraction column was subjected to continuous distillation at 150° C., so that all ammonia was driven off in this single distillation, leaving free monocarboxylic acids as still bottoms containing only trace amounts of nitrogen. The monocarboxylic acids were obtained as the still bottoms product with a yield of 97%; their acid number was 206 and the nitrogen content was below 40 p.p.m. Fractionation of the monocarboxylic acids under reduced pressure resulted in an overhead fraction consisting of secondary and tertiary aliphatic monocarboxylic acids having 16 to 20 carbon atoms to the molecule. The overhead fraction represented 95% of the total monocarboxylic acids obtained. The acid number of the overhead fraction so obtained was 207–208 and had a Hazen color of 80 and a nitrogen content below 20 p.p.m.

Still bottoms, obtained in the distillation of the gasoline phase taken from the extraction column, contained about 3% of the carboxylic acid content of the crude acid charge. The rest of the gasoline phase distillation bottoms consisted essentially of paraffin hydrocarbons, polymers and aromatic hydrocarbons.

I claim as my invention:

1. The process for the recovery of an admixture of unsubstituted saturated aliphatic secondary and tertiary monocarboxylic acids having from fifteen to nineteen carbon atoms to the molecule in a high state of purity from a crude organic mixture obtained by acid-catalyzed carboxylation with carbon monoxide and water of olefinic hydrocarbons having from fourteen the eighteen carbon atoms to the molecule, said organic mixture containing said monocarboxylic acids in admixture with organic impurities not readily separable therefrom by ordinary distillation means comprising close boiling hydrocarbons and higher boiling polymers, which consists essentially of extracting said crude organic mixture in liquid plase with an ammoniacal aqueous alkanol having up to ten carbon atoms flowing countercurrent to a normally liquid paraffinic solvent consisting essentially of gasoline, thereby separating an aqueous phase comprising water and ammonium salts of said monocarboxylic acids from an organic phase comprising gasoline and said organic impurities, and continuously distilling said aqueous phase at decomposition temperature of said ammonium salts, thereby liberating said admixture of secondary and tertiary monocarboxylic acids during said distillation.

2. The process in accordance with claim 1 wherein said alkanol is methanol.

3. The process for the recovery of an admixture of unsubstituted saturated aliphatic secondary and tertiary monocarboxylic acids having from nine to eleven carbons to the molecule in a high state of purity from a crude organic mixture obtained by acid-catalyzed carboxylation with carbon monoxide and water of olefinic hydrocarbons having from eight to ten carbon atoms to the molecule, said organic mixture containing said monocarboxylic acids in admixture with organic impurities not readily separable therefrom by ordinary distillation means comprising close boiling hydrocarbons and higher boiling polymers, which consists essentially of extracting said crude organic mixture in liquid phase with aqueous ammonium hydroxide flowing countercurrent to an organic solvent consisting essentially of gasoline, said ammonium hydroxide being present in an amount ranging from about 20% to about 100% in excess of the stoichiometrical quantity required to react with said monocarboxylic acids, thereby separating an aqueous phase comprising water and ammonium salts of said monocarboxylic acids from an organic phase comprising gasoline and said organic impurities, and continuously distilling said aqueous phase at decomposition temperature of said ammonium salts, thereby liberating said admixture of secondary and tertiary monocarboxylic acids during said distillation.

References Cited in the file of this patent

UNITED STATES PATENTS

| | | |
|---|---|---|
| 2,278,309 | Freeman | Mar. 31, 1942 |
| 2,686,794 | Clayton | Aug. 17, 1954 |
| 2,876,241 | Koch et al. | Mar. 3, 1959 |

FOREIGN PATENTS

| | | |
|---|---|---|
| 137,512 | Russia | Aug. 8, 1960 |

OTHER REFERENCES

Falciola: La Gazzetta Chimica Italiana, vol. 40, II, pages 425–435 (1910).

Weissberger: "Technique of Organic Chemistry," vol. III, pages 253, 299, and 306 (1950).